United States Patent [19]

Kitamura

[11] Patent Number: 5,219,240
[45] Date of Patent: Jun. 15, 1993

[54] ANGLE ADJUSTING DEVICE FOR A DISPLAY DEVICE

[75] Inventor: Yoshiharu Kitamura, Komagane, Japan

[73] Assignee: NHK Spring Co., Ltd., Yokohama, Japan

[21] Appl. No.: 647,360

[22] Filed: Jan. 29, 1991

[30] Foreign Application Priority Data

Jan. 30, 1990 [JP] Japan .................. 2-7027[U]
Apr. 27, 1990 [JP] Japan ................. 2-46423[U]

[51] Int. Cl.⁵ .......................................... F16C 11/00
[52] U.S. Cl. .................................... 403/84; 403/120;
403/146; 16/256; 16/305; 248/284; 248/291
[58] Field of Search ............... 403/356, 146, 120, 84;
16/250, 256, 305, 306, 307; 248/284, 291

[56] References Cited

U.S. PATENT DOCUMENTS

| 340,790 | 4/1886 | Kochsmeier et al. | 16/305 X |
|---|---|---|---|
| 745,887 | 1/1903 | McCready | 16/256 |
| 943,573 | 12/1909 | Simon | 403/84 |
| 1,392,561 | 10/1921 | Duffy | 403/146 |
| 2,867,345 | 1/1959 | Bellek | 16/307 X |
| 3,138,655 | 6/1964 | Navarro et al. | 16/256 X |
| 3,210,800 | 12/1965 | Navarro et al. | 16/256 |
| 3,357,663 | 12/1967 | Ivy | 248/284 X |
| 3,417,953 | 12/1968 | Hillquist et al. | 248/284 X |
| 3,459,462 | 8/1909 | Barnard et al. | |
| 3,564,978 | 2/1971 | Flitz | 403/353 X |
| 3,593,952 | 7/1971 | Smith | 248/284 X |
| 3,861,635 | 1/1975 | Juris | 248/284 |
| 4,225,265 | 9/1980 | Hooker et al. | 403/353 |
| 4,307,626 | 12/1981 | Sanada et al. | 403/120 X |
| 4,356,594 | 11/1982 | Grosemans | 16/307 X |
| 4,387,650 | 6/1983 | Pizzi | 248/291 X |
| 4,394,043 | 7/1983 | Moulding et al. | 248/291 X |
| 4,546,666 | 10/1985 | Secord | 403/353 X |
| 4,738,155 | 4/1988 | Stocker | 403/353 X |
| 4,960,256 | 10/1990 | Chihara et al. | 248/284 |
| 4,976,007 | 12/1990 | Lam | 16/302 |
| 4,995,579 | 2/1991 | Kitamura | 248/284 |
| 5,010,983 | 4/1991 | Kitamura | 248/597 X |
| 5,028,913 | 7/1991 | Kitamura | 248/284 X |
| 5,037,231 | 8/1991 | Kitamura | 403/120 |

FOREIGN PATENT DOCUMENTS

| 569651 | 1/1959 | Canada | 403/146 |
|---|---|---|---|
| 331490 | 9/1989 | European Pat. Off. | 403/146 |
| 562418 | 9/1923 | France | 16/256 |

Primary Examiner—Dave W. Arola
Assistant Examiner—Heather Chun
Attorney, Agent, or Firm—Jacobson, Price, Holman & Stern

[57] ABSTRACT

An angle adjusting device, of which assembling work is performed in narrow space, wherein a rotatable axis previously provided with frictional components thereon is inserted paralelly into a bearing hole provided on a bearing by passing an annular groove provided on the rotatable axis through a vertical slit provided on an edge portion of the bearing, and is inserted horizontally into another bearing hole provided on another edge portion of the bearing.

12 Claims, 11 Drawing Sheets

ANGLE ADJUSTING DEVICE FOR A DISPLAY DEVICE

BACKGROUND OF THE INVENTION

The present invention relates to an angle adjusting device for a display device necessitating an angle adjustment of inclinaton in respect to a main body such as a display device for a lap-top type wordprocessor and personal computer and a lid shaped device, which are used on a pivoting portion thereof.

Figure 29:
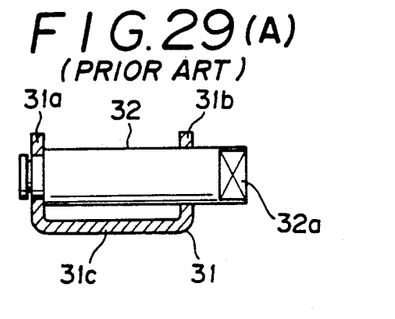

Only a rotatable axis 32 and a bearing 31 of a conventional angle adjusting device are illustrated in FIG. 29. The angle adjusting device has the channel shaped bearing 31, of which edge portions 31a and 31b support the rotatable axis 32 rotatably. Right end 32a of the rotatable axis is formed as a flat portion for coupling, to which a display device or a lid shaped component is connected. Bottom portion 31c is to be fastened on a main body. Then, the angle adjusting device works for pivoting the display device or the lid shaped component.

Since it is necessary to adjust an angle of inclination of the display device or the lid shaped component at an adequate angle for an operator, there have been used various angle adjusting devices, which permit a stepless angle adjustment of inclination.

Figure 31:
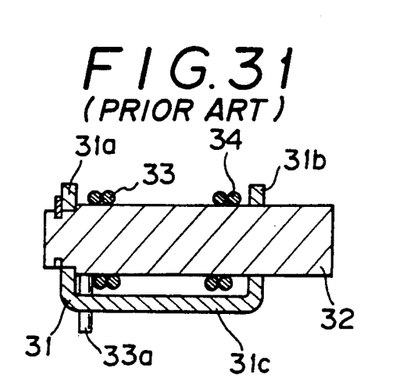
FIGS. 31 and 32 show a sectional view of an assembling order of another conventional rotatable axis supporting device.
Figure 32:
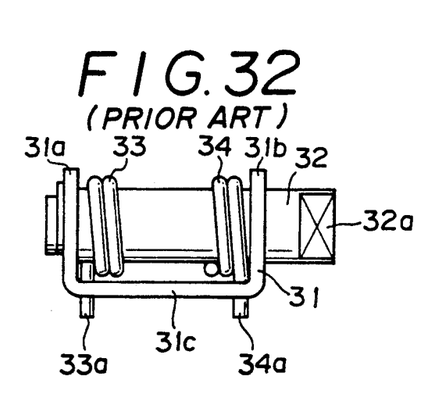

FIGS. 31 and 32 show a second conventional angle adjusting device. The angle adjusting device has a channel shaped bearing 31, of which edge portions 31a and 31b support a rotatable axis 32 rotatably. Coil springs 33 and 34, which have a smaller inner diameter than an outer diameter of the rotatable axis 32, are closely wound over the rotatable axis 32. The coil springs 33 and 34 have free ends and hook portions 33a and 34a inserted in slots 31d (not shown) formed on the bottom portion 31c. On the right end of the rotatable axis 32, a flat portion 32a is formed for coupling a display device.

In this case, an angle of inclination of a display device is held by a frictional force obtained between the rotatable axis 32 and the coil springs 33 and 34. When an outer force superior to the frictional force is applied on the rotatable axis 32 in a turning direction, the angle of inclination is adjusted.

Figure 33:
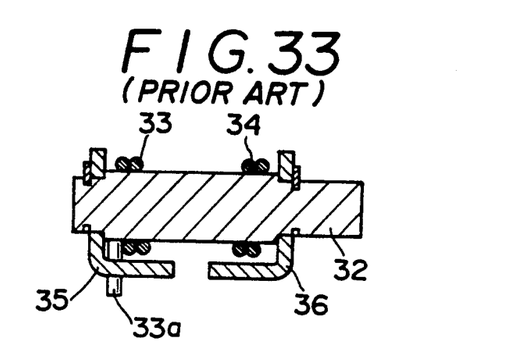
FIGS. 33, 34 and 35 show a sectional view, a front view and a bottom view of another conventional rotatable axis supporting device.
Figure 34:
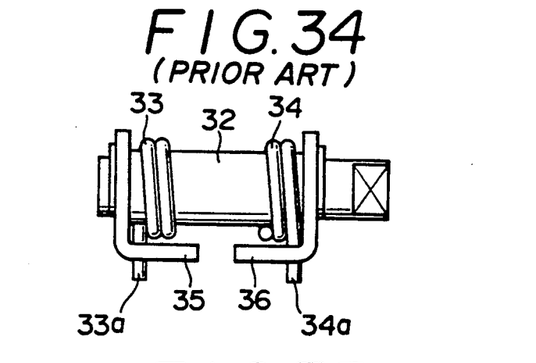
Figure 35:
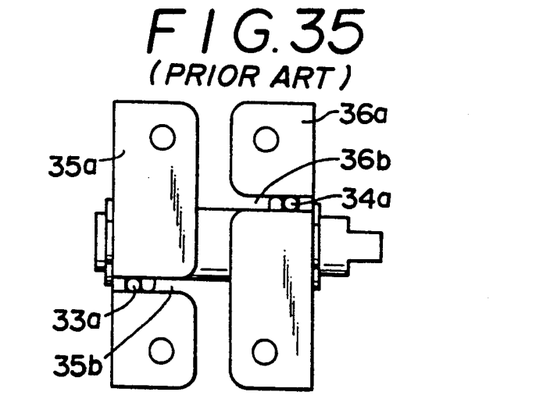

FIGS. 33 to 35 show another example of a conventional angle adjusting device. A rotatable axis 32 is supported rotatably by a pair of bearings 35 and 36. A pair of coil springs 33 and 34 are closely inserted over the rotatable axis 32. The rotatable axis 32 has a coupling portion on the right end. Hook portions 33a and 34a of the coil springs 33 and 34 are inserted into slits 35b and 36b formed on foot portions 35a and 36a of the bearings 35 and 36.

Figure 30:
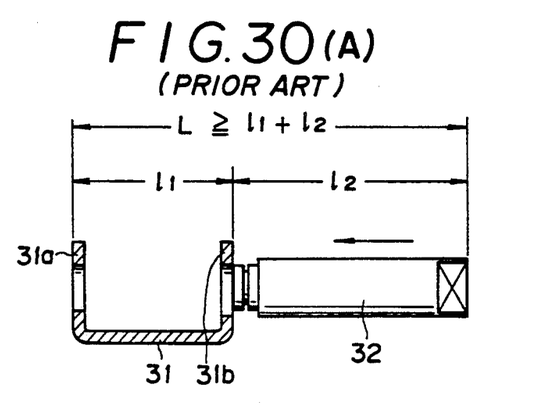

There were problems in the assembling process of the conventional angle adjusting devices shown in FIGS. 29, 31 and 32. In order to assemble the rotatable axis 32 in the bearing 31, firstly, the rotatable axis 32 is placed in a coaxial position with respect to the bearing holes formed on both the edge portions 31a and 31b of the bearing 31 bringing the left end of the rotatable axis 31 to the outer surface of the edge portion 31b of the bearing 31, as shown in FIG. 30 (A). Secondly, the rotatable axis 32 is inserted into the bearing holes as indicated with an arrow in FIG. 30 (B) until the left end of the large diameter portion of the rotatable axis 32 abuts on the inner wall of the edge portion 31a of the bearing 31.

Accordingly, it is necessary to have enough space measuring, at least, a total length L of a length $l_1$ of the bearing 31 and a length $l_2$ of the rotatable axis 32. If it is not available, an assembling operation will be impossible.

In the case of a conventional angle adjusting device shown in FIGS. 31 and 32, the rotatable axis 32 has to be inserted into the edge portions 31a and 31b by keeping the coil springs 33 and 34 enlarged. An assembling operation is not easy and causes a low productivity of the product.

In another case shown in FIGS. 33, 34 and 35, the rotatable axis 32 is inserted into the bearings 35 and 36 after mounting the coil springs 33 and 34 over the rotatable axis 32. Then, an assembling thereof is a little easier, but the number of components is increased.

The present invention was developed taking these situations into consideration and provides an angle adjusting device having less components, which is easy to assemble.

SUMMARY OF THE INVENTION

In order to carry out the above object, an angle adjusting device according to the present invention has a basic rotatable axis supporting device which has a rotatable axis with an annular groove on an outer surface thereof and a bearing which has a vertical slit on at least one edge of the bearing for passing the rotatable axis into the vertical slit by the annular groove.

In this case, at least one coil spring is inserted or positioned closely over the rotatable axis, of which one end is free and the other end is inserted into a slit formed on a foot portion of the bearing. In another variation, both ends of the coil spring are free. A frictional force is obtained between the inner surface of the coil spring and the outer surface of the rotatable axis.

Further, there is another type of friction components to obtain a frictional force on a rotatable axis. The friction components consist of a plurality of fixed friction discs slidably supported in an axial direction by the rotatable axis, of which rotation is restrained by a foot portion of and bearing, a plurality of rotatable friction discs supported slidably in an axial direction and rotatably together with the rotatable axis by the rotatable axis, which are intercalated alternately with the fixed friction discs, and a compression spring compressing both sets of friction discs. Then, a predetermined frictional force is obtained between the fixed friction discs and the rotatable friction discs.

After finishing the above assembling operation, the rotatable axis is inserted into the bearing holes of the bearing by passing an annular groove and a reduced portion thereof through vertical slits of the bearing.

BRIEF DESCRIPTION OF THE DRAWINGS

FIGS. 1 (A) and (B) show a sectional view and a right side view of a basic rotatable axis supporting device according to the present invention.

FIGS. 2 (A) and (B) show an assembling order and a lateral view of the assembling order of the basic rotatable axis supporting device.

FIGS. 3 (A) and (B) show a sectional view and a right side view of the assembling of the basic rotatable axis supporting device.

FIGS. 9 (A) and (B) show a sectional view and a front view of a rotatable axis shown in FIGS. 4–8.

FIGS. 10 (A), (B) and (C) show a sectional view, a left side view and a right side view of a bearing shown in FIGS. 4–8.

FIGS. 11 (A), (B) and (C) show an assembling order for the first embodiment shown in FIGS. 4–8.

FIGS. 14 (A) and (B) show a left side view and a front view of a fixed axis of the second embodiment shown in FIGS. 12 and 13.

FIGS. 15 (A) and (B) show a sectional view and a front view of a rotatable axis of the second embodiment shown in FIGS. 12 and 13.

FIGS. 16 (A), (B) and (C) show a left side view, a sectional view and a right side view of a bearing of the second embodiment shown in FIGS. 12 and 13.

FIGS. 17 (A), (B) and (C) show an assembling order for the second embodiment shown in FIGS. 12 and 13.

FIGS. 20 (A), (B) and (C) show a sectional view, a front view and a right side view of a rotatable axis of the third embodiment shown in FIGS. 18 and 19.

FIGS. 21 (A), (B), (C) and (D) show a left side view, a sectional view, a right side view and a plan view of a bearing of the third embodiment shown in FIGS. 18 and 19.

FIGS. 22 (A), (B) and (C) show an assembling order for the third embodiment shown in FIGS. 18 and 19.

FIGS. 27 (A), (B), (C) and (D) show a front view, a left side view, a right side view and a top view of a rotatable axis of the fourth embodiment shown in FIGS. 24–26.

FIGS. 27 (E) and (F) show a front view of a fixed friction disc and a front view of a rotatable friction disc of the fourth embodiment of FIGS. 24–26.

FIGS. 28 (A) and (B) show an assembling order for the fourth embodiment of FIGS. 24–26.

FIGS. 29 (A) and (B) show a sectional view and a right side view of a conventional rotatable axis supporting device.

FIGS. 30 (A) and (B) show an assembling order of the conventional rotatable axis supporting device.

DETAILED DESCRIPTION OF THE PREFERRED EMBODIMENTS

Hereinafter, some of the embodiments according to the present invention will be described referring to the drawings, wherein identical elements are indicated with identical numbers so as to avoid a repetitive description.

Figure 1:
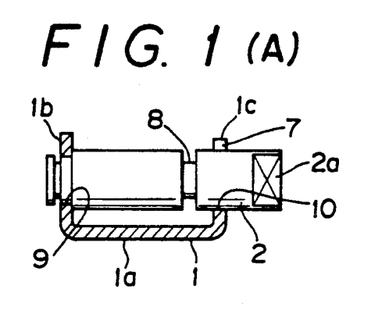

FIG. 1 shows a basic rotatable axis supporting device according to the present invention.

Figure 4:
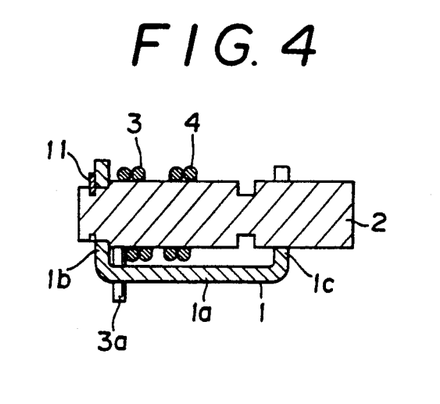
FIGS. 4, 5, 6, 7 and 8 show a sectional view, a front view, a left side view, a right side view and a bottom view of a first embodiment of the invention utilizing the basic device shown in FIGS. 1 (A) and (B).
Figure 6:
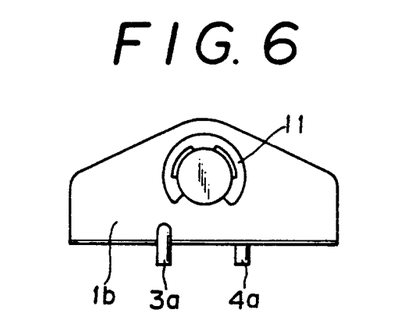
Figure 7:
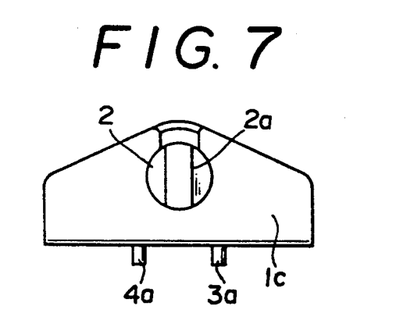
Figure 8:
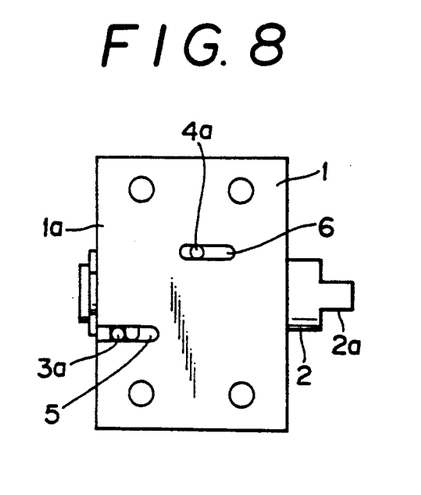
Figure 9A:
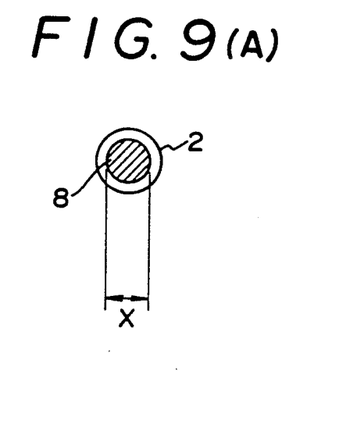
Figure 9B:
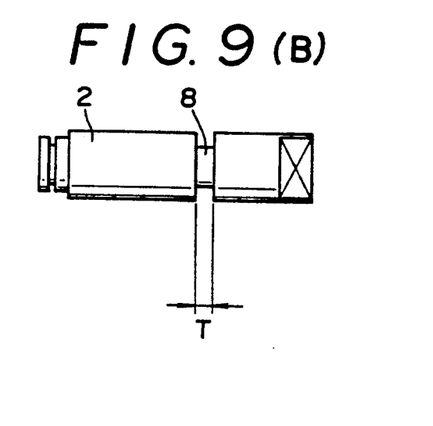

The rotatable axis supporting device is provided with a bearing 1 having a foot portion 1a for fastening directly or indirectly on a main body and a rotatable axis 2 for supporting a display device or a lid shaped component directly or indirectly. The bearing 1 is made of channel form material and, defines a channel-shaped member, supports the rotatable axis 2 rotatably, and which is provided with bearing holes 9 and 10 on edge portions 1b and 1c thereof. The rotatable axis 2 is to be retained by a snap ring (e.g., 11 in FIGS. 4 and 6).

The edge portion 1c is provided with a vertical slit 7, of which the center line passes through the center of the bearing hole 10, and a width thereof is a little narrower than the diameter of the rotatable axis 2. The rotatable axis 2 is provided with an annular groove 8 approximately on its center, the diameter of which is slightly smaller than the width of the slit 7, so as to pass the annular groove 8 through the slit 7. A coupling portion 2a is provided on the right end of the rotatable axis 2, which is to be connected to a display device.

Figure 2:
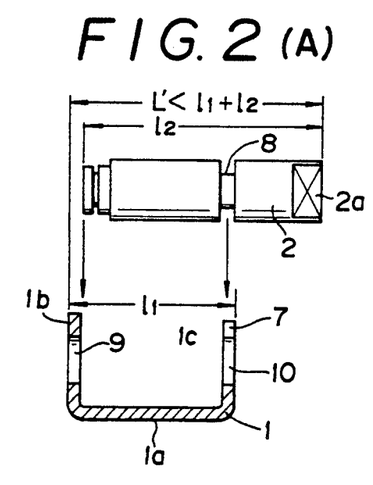
Figure 3:
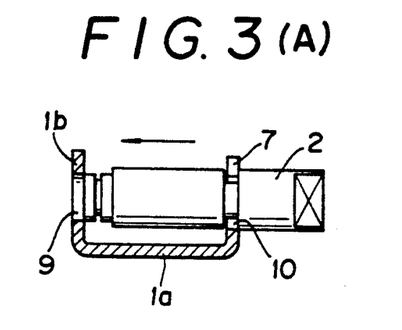

Hereinafter, an assembling operation of the basic rotatable axis supporting device will be described in detail referring to FIGS. 2 (A) and (B). Firstly, the annular groove 8 of the rotatable axis 2 is located in an upper position above the slit 7 and in parallel with an axial direction of the bearing 1 with the coupling portion 2a to the right. Then, the annular groove 8 is inserted into the slit 7 and the rotatable axis 2 is inserted into the bearing holes 9 and 10 as shown in FIGS. 3 (A) and (B).

A length L', which is necessary for assembling the rotatable axis 2 on the bearing 1, is shorter than the total length of the length $l_1$ of the bearing 1 and the length $l_2$ of the rotatable axis 2. Therefore, much less space is needed for the assembling operation of the rotatable axis on the bearing than in the case of the conventional examples shown in FIGS. 29 and 30 (A) and (B), resulting in remarkable saving of assembling space and facilitating the assembling operation.

FIGS. 4 to 11 show a first embodiment of an angle adjusting device according to the present invention, which is used on a pivoting portion of a main body (not shown) necessitating an angle adjustment of inclination of a display device (not shown) so as to support the display device rotatably. The angle adjusting device has a bearing 1 to be fastened on a main body directly or indirectly, a rotatable axis 2 to be fastened on a display device directly or indirectly and two coil springs 3 and 4 closely wound over the rotatable axis 2. The bearing 1 is of channel form, of which bottom portion 1a has slots 5 and 6 formed in positions for receiving projecting hook of the coil springs 3 and 4 in the bottom portion 1a which is to be fastened on the main body.

The rotatable axis 2 is supported rotatably by both edge portions 1b and 1c of the bearing 1. The rotatable axis is retained by a snap ring 11 mounted on the left end of the rotatable axis 2. A non-circular coupling portion 2a is formed on the right end of the rotatable axis 2, which is to be connected to a display device necessitating an angle adjustment of inclination. When an angle of inclination of the display device is changed, the rotatable axis is rotated.

An inner diameter of the coil springs 3 and 4 is a little smaller than the outer diameter of the rotatable axis 2 in a free state, and is enlarged so as to insert externally over the rotatable axis 2. Therefore, a frictional force is obtained between the inner diameter of the coil springs 3 and 4, and the outer surface of the rotatable axis 2. The coil springs 3 and 4 have free ends and the hook portions 3a and 4a to be inserted into the slots 5 and 6 formed in the bottom portion 1a of the bearing 1.

Figure 5:
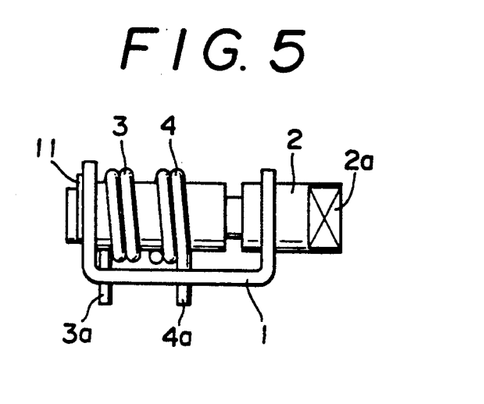
Figure 10A:
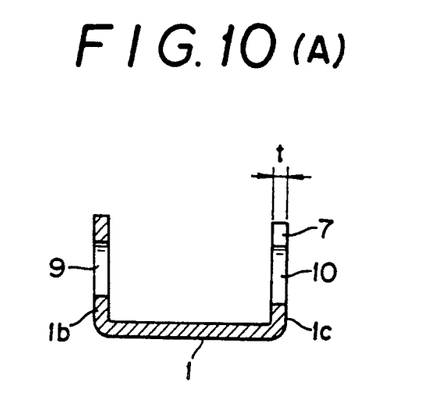
Figure 10B:
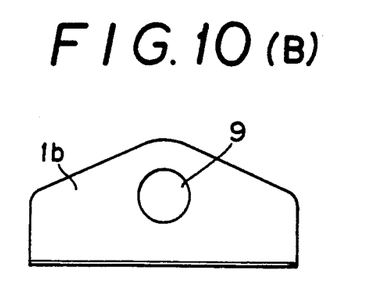
Figure 10C:
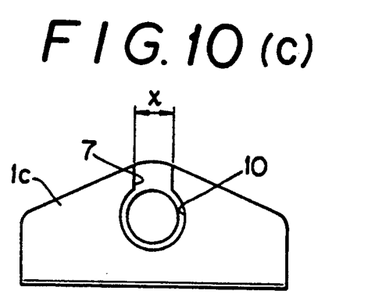
Figure 11:
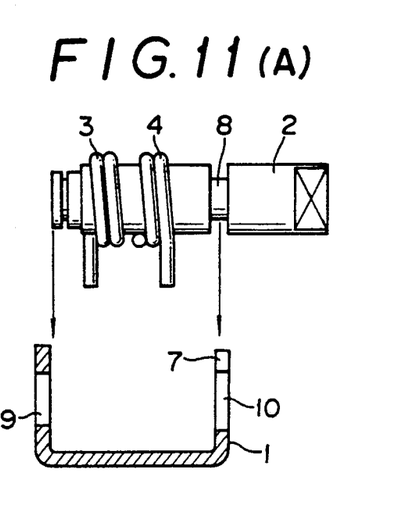

As previously indicated, the rotatable axis 2 has the annular groove 8 on an intermediate portion thereof. The bearing 1 has the vertical slit 7 and bearing holes 9 and 10 formed in edge portions thereof as shown in FIG. 10. The center line of the slit 7 passes through the center of the bearing hole 10. As the bottom diameter of the annular groove 8 is little smaller than the width of the slit 7, the rotatable axis 2 is inserted into the bearing hole 10 by passing the annular groove 8 through the slit 7. The dimensional relation of the annular groove 8 and the slit 7 is defined as follows:

$$X<x, \text{ and } T<t$$

wherein
X: diameter of the annular groove 8
x: width of the slit 7
T: width of the annular groove 8
t: thickness of the edge portion 10 of the bearing Hereinafter, an assembling operation of the first embodiment is described referring to FIGS. 11 (A), (B) and (C). The coil springs 3 and 4 are inserted externally over the rotatable axis 2. The rotatable axis 2 is inserted vertically into the bearing hole 10 by passing the annular groove 8 through the slit 7 as shown in FIGS. 11 (A) and (B). The rotatable axis 2 is inserted horizontally into the bearing hole 9. Then, the left end of the rotatable axis is retained with the snap ring 11 as shown in FIG. 5.

In this case, since the rotatable axis 2, over which the coil springs 3 and 4 are inserted previously, is mounted on the bearing 1, a minor space is sufficient for the assembling operation, dispensing with a large space which is necessary for assembling of a conventional angle adjusting device as shown in FIG. 30 and a pair of separate type bearings as shown in FIGS. 33, 34 and 35. Also, it is possible to reduce man power and improve productivity.

Figure 12:
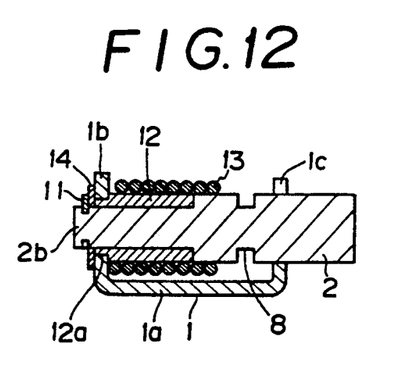
FIGS. 12 and 13 show a sectional view and a front view of a second embodiment.
Figure 13:
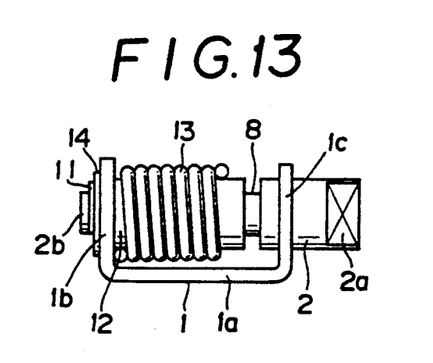
Figure 14A:
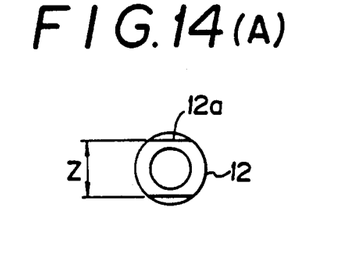
Figure 14B:
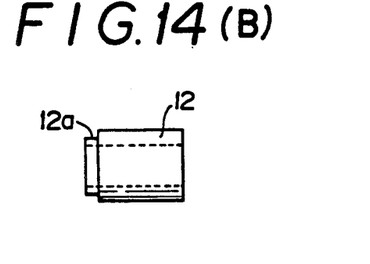
Figure 15A:
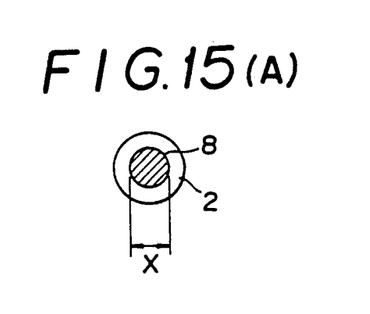
Figure 15B:
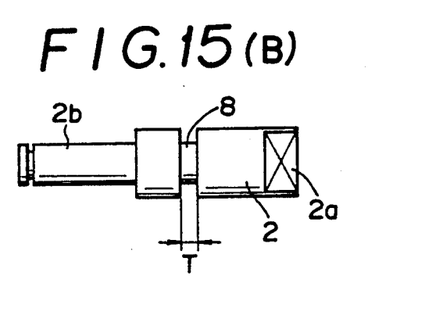
Figure 16A:
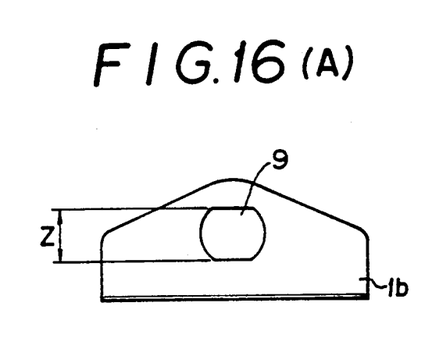
Figure 16B:
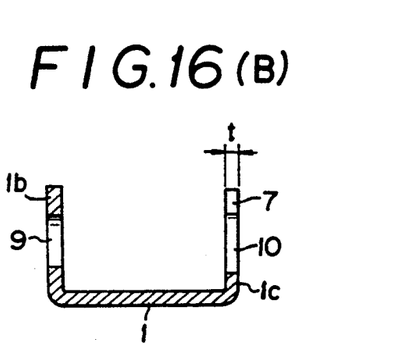
Figure 16C:
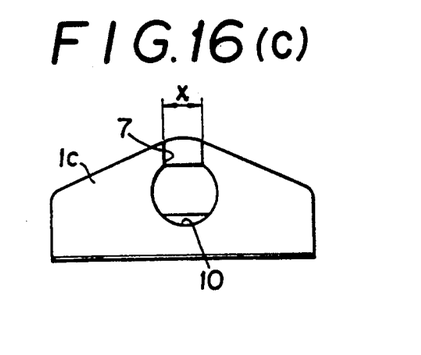

FIGS. 12 to 17 show a second embodiment of the angle adjusting device according to the present invention. In this case, a fixed axis 12 is of tubular form, of which small diameter portion 12a is fixed in a bearing hole 9 of an edge portion 1b of the bearing 1. A coil spring 13 is inserted over the fixed axis 12 and a rotatable axis 2. The small diameter portion 12a of the fixed axis 12 and the bearing hole 9 have non-circular sections as shown in FIGS. 12, 14 (A) and 16 (A) so as to be fixed on the bearing 1. The rotatable axis 2 has a small diameter portion 2b, an annular groove 8 and a coupling portion 2a as shown in FIGS. 15 (A) and (B). The small diameter portion 2b is inserted rotatably into the fixed axis 12. The number of effective windings of the coil spring 13 on the fixed axis 12 is larger than that on the rotatable axis 2. Then, the coil spring 13 is fixed on the fixed axis 12, and a frictional force is obtained between the inner surface of the coil spring 13 and the outer surface of the rotatable axis 2. The rotation of the rotatable axis 2 is locked by the frictional force. In this case, dimensional relations of a slit 7 of the bearing 1 and the annular groove 8 of the rotatable axis 2 are identical to those in the first embodiment.

Figure 17:
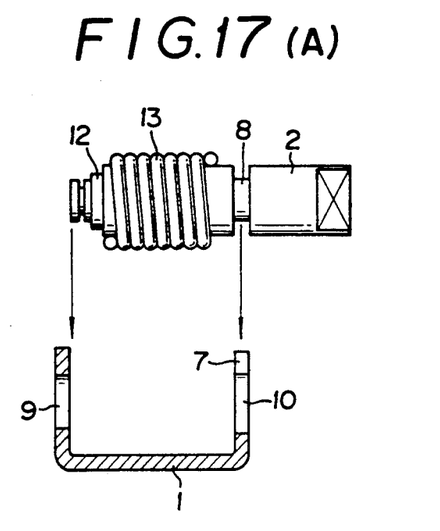

An assembling operation of the second embodiment is performed as follows: The coil spring 13 is inserted externally over the fixed axis 12 and the rotatable axis 2 inserted into the fixed axis 12 rotatably. The rotatable axis 2 with the fixed axis 12 and the coil spring 13 is inserted into a bearing hole 10 by passing the annular groove 8 through the slit 7 of the bearing 1 as shown in FIGS. 17 (A) and (B). Then, the rotatable axis 2 is inserted into the bearing hole 9 of the left edge 1b of the bearing 1 as shown in FIGS. 17 (B) and (C), and the rotatable axis 2 is retained by a snap ring 11 as shown in FIG. 12.

In this assembling work of the second embodiment, the same desirable effect is obtained work as in the assembling work of the first embodiment.

Figure 18:
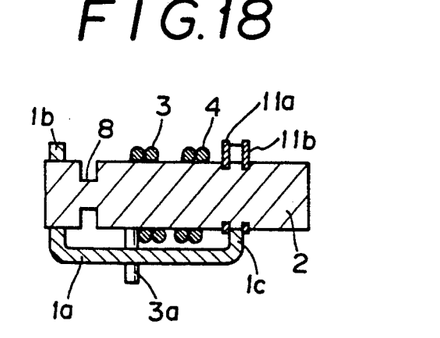
FIGS. 18 and 19 shown a sectional view and a front view of a third embodiment.
Figure 19:
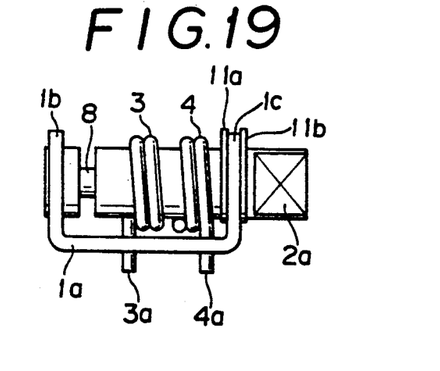
Figure 20A:
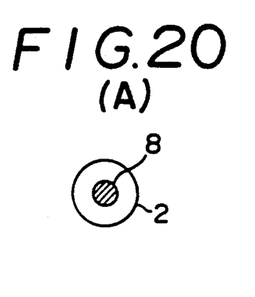
Figure 20B:
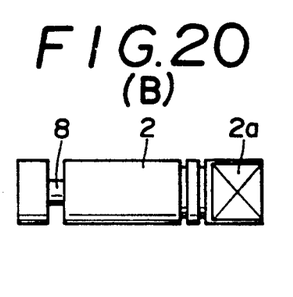
Figure 20C:
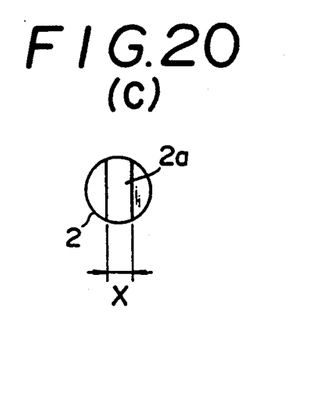
Figure 21A:
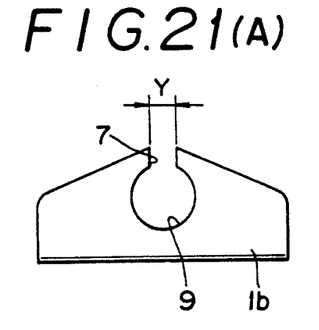
Figure 21B:
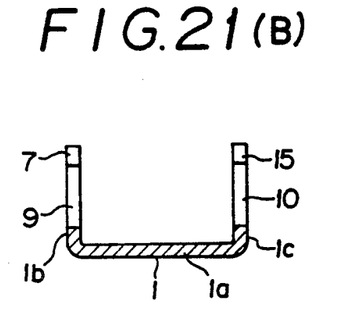
Figure 21C:
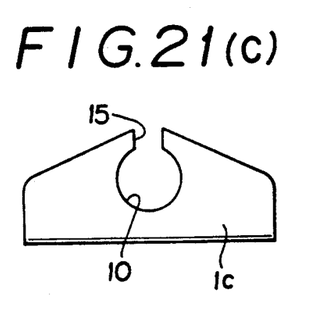
Figure 21D:
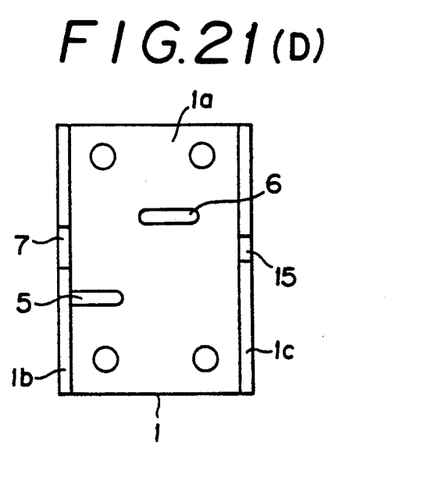

FIGS. 18 to 22 show a third embodiment. In this case, an annular groove 8 is formed on the left portion of a rotatable axis 2 as shown in FIGS. 18, 19 and 20. A vertical slit 7 is formed on the left edge 1b of a bearing 1 so that the center line of the slit 7 passes through the center line of bearing hole 9 of the bearing 1 as shown in FIGS. 21 (A) and (B). The width of the slit 7 is little larger than the diameter of the annular groove 8 of the rotatable axis 2. Another vertical slit 15 is formed on the right edge 1c of the bearing 1. The width of the slit 15 is little larger than the thickness of a coupling portion 2a formed on the right end of the rotatable axis 2. A foot portion 1a of the bearing 1 has two slots 5 and 6 formed in projecting positions of the hooks 3a and 4a of coil springs 3 and 4 as shown in FIG. 21 (D).

Figure 22A:
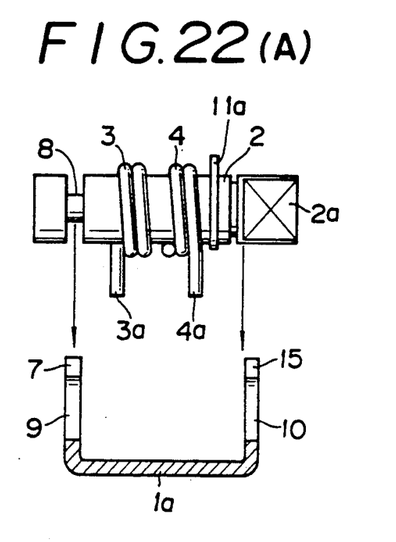
Figure 22B:
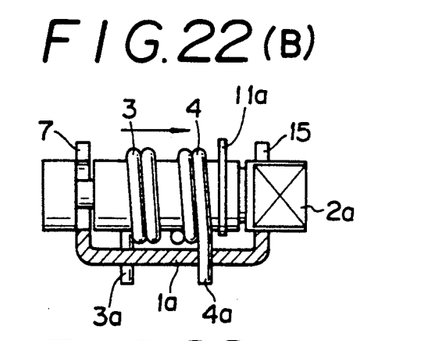
Figure 22C:
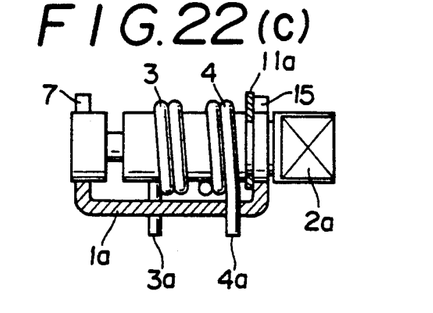

In this case, an assembling operation is performed as follows: The rotatable axis 2, on which is previously mounted the two coil springs 3 and 4, and a snap ring 11a, is inserted vertically into the bearing holes 9 and 10 by passing the annular groove 8 and the coupling portion 2a through the slits 7 and 15 respectively and by inserting both hook ends 3a and 4a of the coil springs 3 and 4 into the slots 5 and 6 as shown in FIGS. 22 (A) and (B). Then, the rotatable axis 2 is slid to the right until the snap ring 11a hits the inner wall of the right edge 1c of the bearing 1 so as to retain with another snap ring 11b. Accordingly, the same effect is obtained as in the first and second embodiments.

Figure 23:
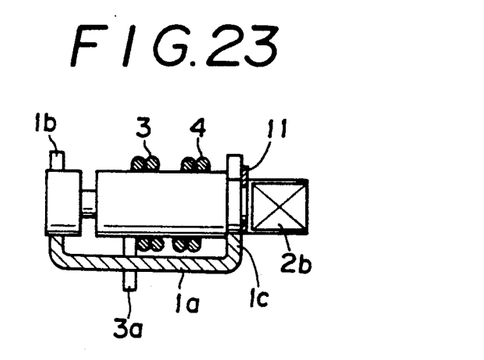
FIG. 23 shows another variation of the third embodiment shown in FIGS. 18 and 19.
Figure 24:
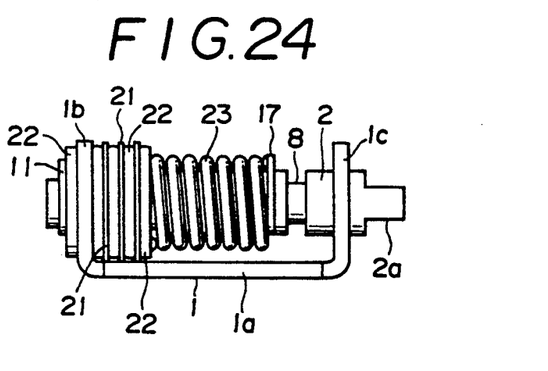
FIGS. 24, 25 and 26 show a front view, a left side view and a right side view of a fourth embodiment.
Figure 25:
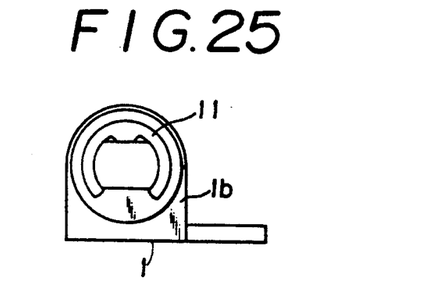
Figure 26:
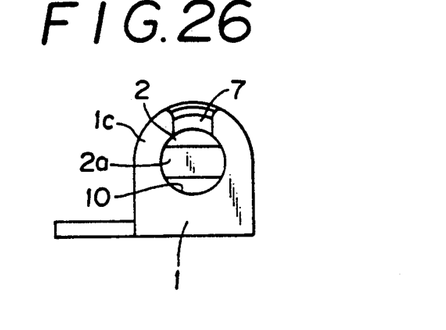
Figure 27A:
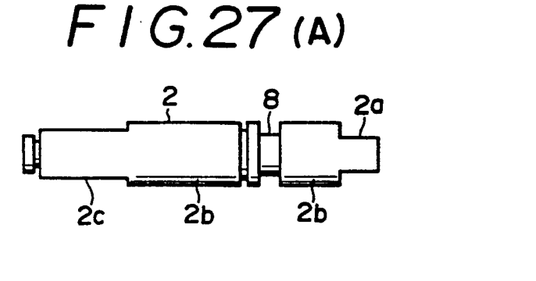
Figure 27B:
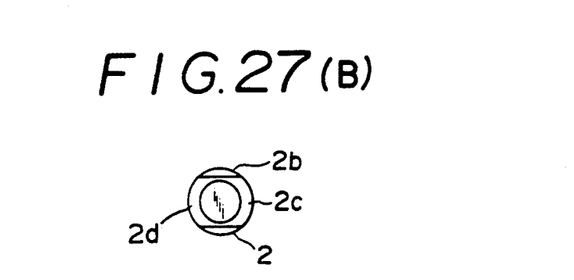
Figure 27C:
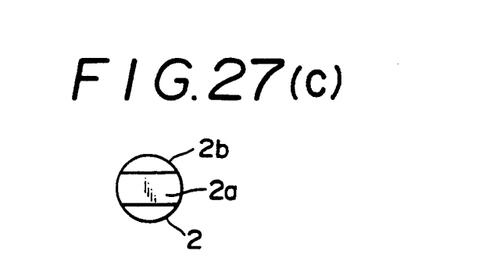
Figure 27D:
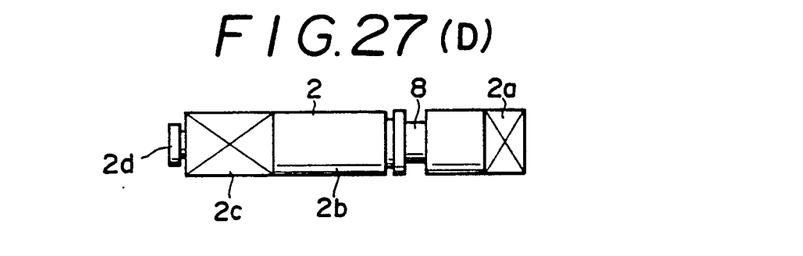
Figure 27E:
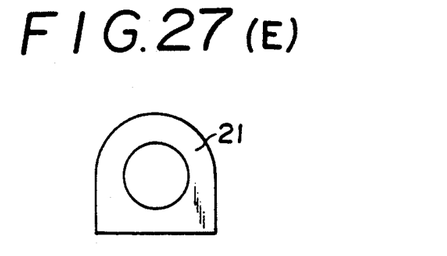
Figure 27F:
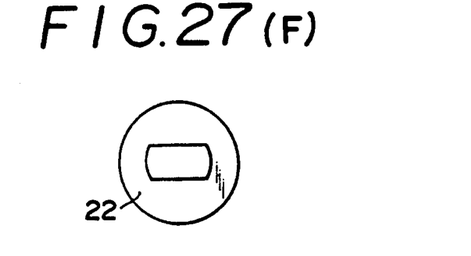

FIG. 23 shows a simple variation of the third embodiment. In this case, the snap ring 11a shown in FIG. 22 is eliminated by forming a small diameter portion 2b between the large diameter portion and a coupling portion 2a of a rotatable axis 2, for receiving a snap ring 11.

Figure 28:
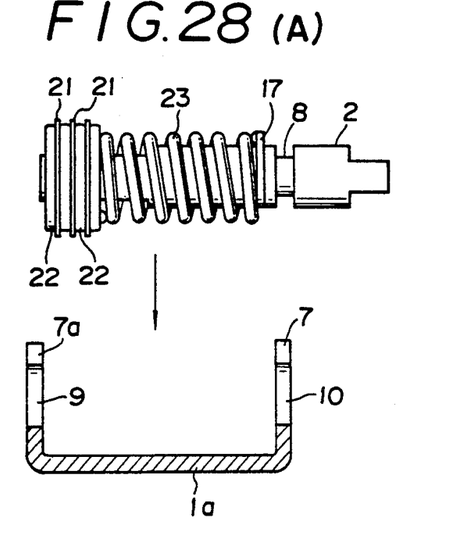

FIGS. 24 to 28 show a fourth embodiment of the present invention. A rotatable axis 2 is locked by a frictional force obtained between a plurality of fixed friction discs 21 and a plurality of rotatable friction disc 22 alternately intercalated with the fixed friction discs 21, which discs are compressed by a compression spring 23. The rotatable axis 2 has a non-circular coupling portion 2a, a large diameter portion 2b, a non-circular portion 2c for externally receiving inserting a plurality of fixed friction discs 21 and a plurality of rotatable friction discs 22, a small diameter portion 2d and an annular groove 8 as shown in FIGS. 27 (A), (B), (C) and (D). Each fixed friction disc 21 has a non-circular portion as shown in FIG. 27 (E), of which a center hole is a little larger than the outer diameter of the non-circular portion 2c of the rotatable axis 2. Each rotatable friction disc 22 shown in FIG. 27 (F) has a non-circular center hole, which form corresponds to the section of the non-circular portion 2c of the rotatable axis 2 shown in FIG. 27 (B). Numerals 11 and 17 show snap rings. A bearing 1 has a foot portion 1a for fixation and edge portions 1b and 1c supporting the rotatable axis 2. The edge portions 1b and 1c have bearing holes 9 and 10, and vertical slits 7 and 7a as shown in FIG. 28 (A). The center lines of the vertical slits 7 and 7a pass through the center line of the bearing holes 9 and 10 respectively as shown in FIG. 28 (A).

An assembling of the fourth embodiment will be described referring to FIGS. 28 (A) and (B). An assembling of the rotatable axis 2 on the bearing 1 is performed after mounting the snap ring 17, compression spring 23, the rotatable friction discs 22 and the fixed friction discs 21 over the rotatable axis 2. Then, the snap ring 17 and the compression spring 23 are put over the large diameter portion 2b of the rotatable axis 2. The fixed friction discs 21 intercalated by the rotatable friction discs 22 are externally inserted over the non-circular portion 2c of the rotatable axis 2. The compression spring 23 is longer than the length of the large diameter portion 26 of the rotatable axis 2 in a free state. The rotatable axis 2 provided with components aforementioned is inserted parallel to and into coaxial relationship with the center line of the bearing holes 9 and 10 by passing the ring groove 8 through the slit 7 and the small diameter portion 2d of the rotatable axis 2 through the slit 7a as indicated with an arrow in FIG. 28 (A). In this case, the fixed friction discs 22 have to be aligned so as to seat the non-circular portions of the fixed friction discs 21 on the surface of the foot portion 1a. Then, shoulder portions of the non-circular portion 2c are inserted into the bearing hole 9 by compressing the compression spring 23 so as to retain the rotatable axis 2 with the snap ring 11.

When the rotatable axis 2 is rotatated, the rotatable friction discs 22 slide along the non-circular portion 2c of the rotatable axis 2 and rotate together with the axis 2, and the fixed friction discs 21 do not rotate because of the non-circular portions thereof and slide along the non-circular portion 2c. Since both friction discs 21 and 22 are compressed by the compression spring 23, a frictional force is obtained between the fixed friction discs 21 and the rotatable friction discs 22. As described above, a space necessary for assembling the basic rotatable axis supporting device is saved and assembling thereof is simplified remarkably, reducing the number of components.

What is claimed is:

1. An angle adjusting device for a display device comprising:

a basic rotatable axis supporting device comprising a bearing in the form of a channel-shaped member comprising a one-piece body having a bottom portion for fixation and two edge portions each provided with a bearing hole, wherein one of the edge portions has a vertical slit, the center line of which passes through the center of said bearing hole in said one edge portion; and a rotatable axis provided with a coupling portion to be connected to the display device, an annular groove on said axis for passing through said slit in said one edge portion, a friction component means supporting portion on said axis, and a small diameter portion on said axis for passing through the other of said bearing holes and having an annular groove provided with a snap ring therein; and friction component means positioned externally over said rotatable axis onto said friction component means supporting portion for locking rotation of said rotatable axis by means of friction force, and for allowing said axis to rotate when being subject to external force greater than said friction force.

2. An angle adjusting device according to claim 1, wherein said other edge portion also has a second vertical slit and said rotatable axis has a portion of a reduced dimension for passing through said second vertical slit.

3. An angle adjusting device as recited in claim 2, wherein said rotatable axis has at least one additional annular groove for being positioned adjacent said other edge portion of said bearing, and provided with a snap ring therein.

4. An angle adjusting device as recited in claim 2, wherein said portion of a reduced dimension is said coupling portion.

5. An angle adjusting device according to claim 1, wherein said small diameter portion of said rotatable axis is supported rotatably by a fixed axis which is fitted into said other bearing hole, and which has a friction component means supporting portion, and wherein an outer diameter of the fixed axis is equal to a diameter of said friction component means supporting portion of said rotatable axis.

6. An angle adjusting device according to claim 5, wherein said friction component means comprises a coil spring closely inserted over said fixed axis and said rotatable axis on said friction component means supporting portions thereof, and wherein said rotatable axis receives a lesser number of spring windings than said fixed axis and slips on an inner surface of said coil spring.

7. An angle adjusting device according to claim 1, wherein said friction component means supporting portion of said rotatable axis has two flat and parallel surfaces on an end portion thereof.

8. An angle adjusting device according to claim 7, wherein said friction component means comprises a plurality of fixed friction discs and a plurality of rotatable friction discs intercalated alternately and supported slidably in an axial direction by said flat and parallel surfaces of said rotatable axis, and a compression spring positioned externally over said rotatable axis so as to compress said friction discs, and wherein said fixed friction discs have non-circular portions and the rotation of said fixed friction discs is restrained by said non-circular portions being seated on said bottom portion of said bearing, and said rotatable friction discs are rotated by said rotatable axis.

9. An angle adjusting device according to claim 1, wherein both of said edge portions of said bearing are provided with a vertical slit.

10. An angle adjusting device according to claim 1, wherein said bottom portion has at least one slot for receiving a projecting portion of said friction component means therein.

11. An angle adjusting device according to claim 10, wherein said friction component means comprises, at least, a coil spring closely inserted over said friction component means supporting portion, and wherein one end of said spring is free and another end is formed as a hook portion defining said projecting portion and inserted in said slot.

12. An angle adjusting device as recited in claim 2, wherein said rotatable axis has a pair of additional annular grooves for being positioned on opposite sides of said other edge portion of said bearing, and provided with snap rings therein.

* * * * *